(12) United States Patent
Cheng et al.

(10) Patent No.: US 8,041,440 B2
(45) Date of Patent: Oct. 18, 2011

(54) METHOD AND SYSTEM FOR PROVIDING A SELECTION OF GOLDEN TOOLS FOR BETTER DEFECT DENSITY AND PRODUCT YIELD

(75) Inventors: Chang Yung Cheng, Tainan (TW); Hsueh-Shih Fu, Hsin-Chu County (TW); Ying-Lang Wang, Tai-Chung County (TW); Chin-Kun Wang, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 429 days.

(21) Appl. No.: 11/683,305

(22) Filed: Mar. 7, 2007

(65) Prior Publication Data

US 2008/0021585 A1 Jan. 24, 2008

Related U.S. Application Data

(60) Provisional application No. 60/830,801, filed on Jul. 13, 2006.

(51) Int. Cl.
*G06F 19/00* (2006.01)
*G06F 17/50* (2006.01)
*G06Q 10/00* (2006.01)

(52) U.S. Cl. ............. 700/99; 700/95; 700/100; 716/51; 716/52; 716/53; 716/54; 716/55; 705/7.12; 705/7.13; 705/7.22; 705/7.23

(58) Field of Classification Search .................. None
See application file for complete search history.

(56) References Cited

U.S. PATENT DOCUMENTS

| | | | |
|---|---|---|---|
| 4,902,608 A * | 2/1990 | Lamb et al. | 430/325 |
| 6,353,222 B1 * | 3/2002 | Dotan | 250/310 |
| 7,515,982 B2 * | 4/2009 | Varadhan et al. | 700/100 |
| 7,587,704 B2 * | 9/2009 | Ye et al. | 716/21 |
| 7,617,477 B2 * | 11/2009 | Ye et al. | 716/21 |
| 2003/0093762 A1 * | 5/2003 | Rietman et al. | 716/2 |
| 2006/0141782 A1 * | 6/2006 | Hasebe et al. | 438/680 |
| 2007/0233629 A1 * | 10/2007 | Balog | 706/47 |
| 2008/0004739 A1 * | 1/2008 | Varadhan et al. | 700/100 |

* cited by examiner

*Primary Examiner* — Albert DeCady
*Assistant Examiner* — Sunray Chang
(74) *Attorney, Agent, or Firm* — Haynes and Boone, LLP

(57) ABSTRACT

Aspects of the present disclosure provide a method and a system for providing a selection of golden tools for better defect density and product yield. A golden tool selection and dispatching system is provided to integrate different components for robust golden tool selection and dispatching. The golden tool selection system selects a set of golden tools based on performance of a set of manufacturing tools and provides a fully automated operational environment to produce a product using the set of golden tools.

20 Claims, 3 Drawing Sheets

METHOD AND SYSTEM FOR PROVIDING A SELECTION OF GOLDEN TOOLS FOR BETTER DEFECT DENSITY AND PRODUCT YIELD

CROSS REFERENCE

This application claims priority to U.S. Provisional Patent Application Ser. No. 60/830,801, filed on Jul. 13, 2006.

BACKGROUND

A golden product is a product that has zero defect. In the semiconductor manufacturing industry, it is often difficult to manufacture a golden product because of unavoidable defects in the fabrication process. Defects in a product are typically measured in terms of a defect density, which represents the number of defects detected in a given area of the product. In order to approach or achieve the production of a golden product, a reduction in defect density is necessary. However, the reduction of defect density is often difficult to achieve because different products may have different defect density improvement rates. For example, a large die product may show a better product yield than a smaller die product, even though both products' defect densities are reduced at a same rate. A need exists for a method that focuses defect density reduction on products that provide the best return-on-investment for the manufacturing facilities in order to generate a better product yield. A need also exists for a service model that gains better defect density and yield for products that are critical to the customers.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
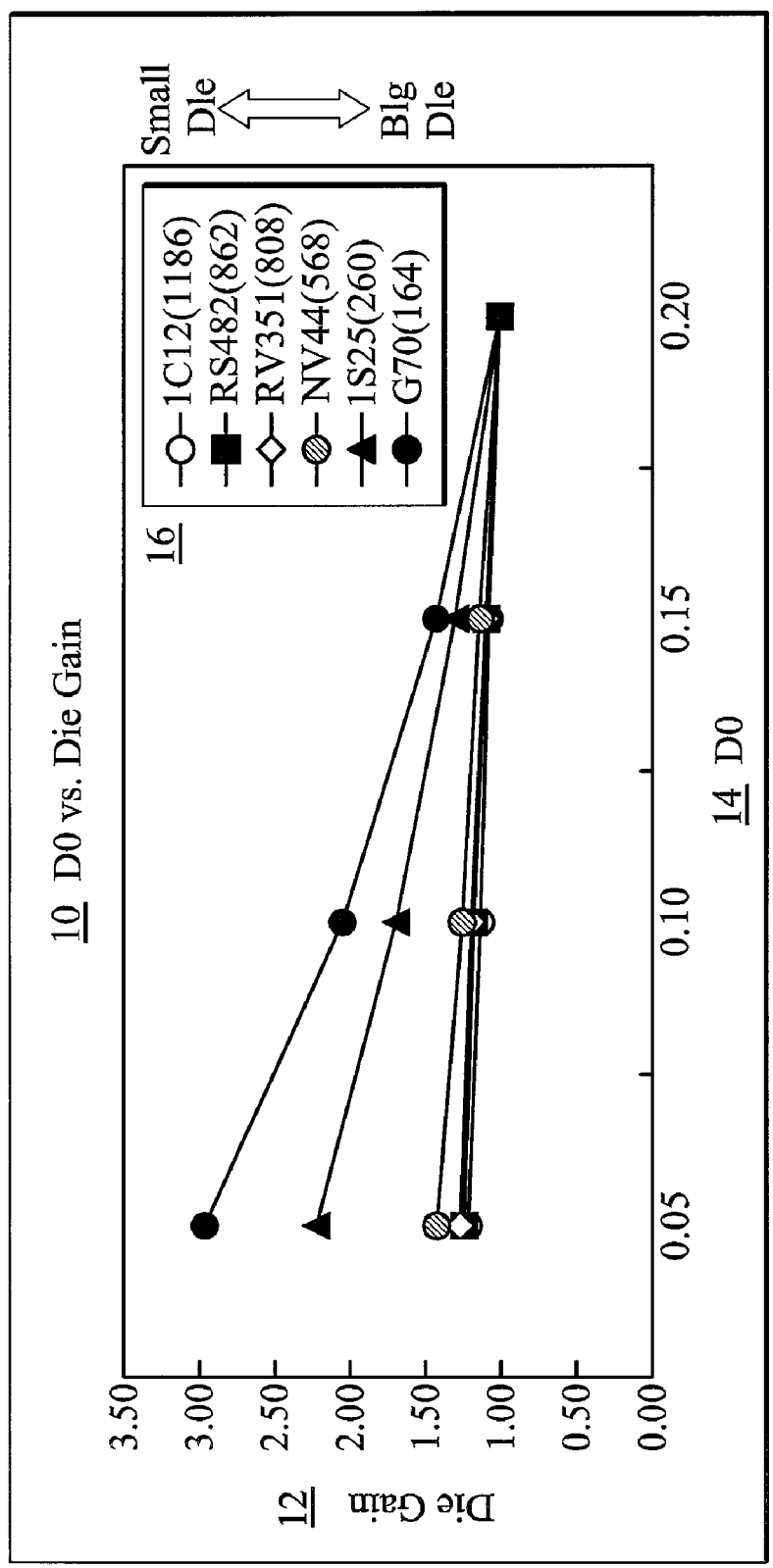
FIG. 1 is an exemplary comparison of die gains between large and small die products.

FIG. 1 is an exemplary comparison of die gains between large and small die products. Graph 10 is a graph of die gain 12 versus defect density 14 for die products 16. Die products are arranged based on their sizes. Graph 10 shows that as the defect density is reduced from 0.2 to 0.05, large die products realize a higher die gain than the smaller die products. In this example, a large die product, such as G70, realizes three times the die gain a smaller die product, such as 1C12, realizes. This indicates that defect density reduction is more critical to large die products than to smaller die products.

Figure 2:
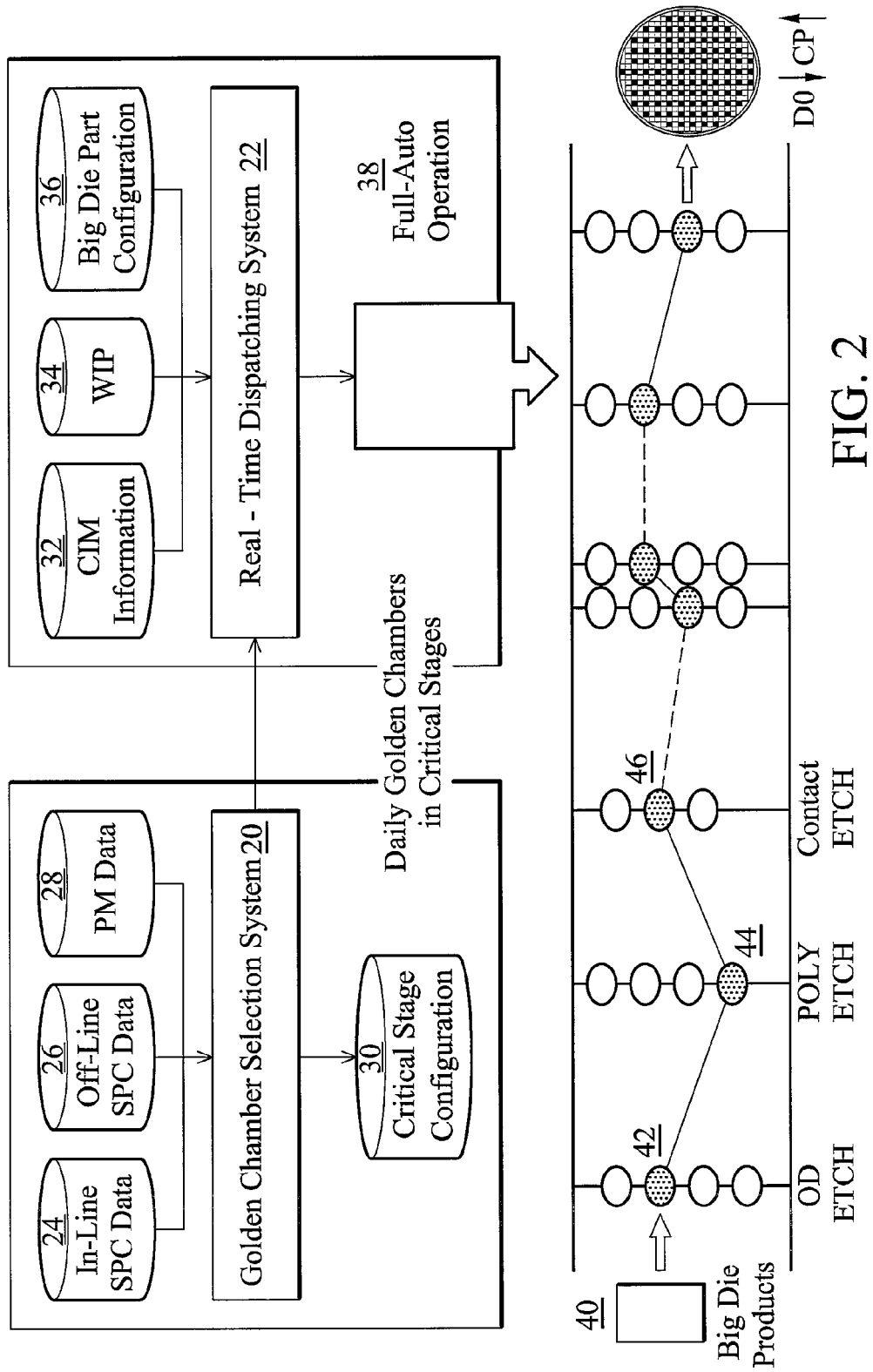
FIG. 2 is a block diagram of an embodiment of a golden tool selection and dispatching system.

FIG. 2 is a block diagram of an embodiment of a golden tool selection and dispatching system. As shown in FIG. 2, the aspects of the present disclosure comprise a golden chamber selection system 20 for selecting golden tools and a real-time dispatching system 22 for assigning a product to the set of golden tools. Golden chamber selection system 20 takes data from an inline statistical process control (SPC) database 24, offline statistical process control (SPC) database 26, and periodic maintenance (PM) database 28 as input data and generates a selection of golden tools based on this input data.

Inline statistical process control database 24 comprises data collected during control wafer processing and is used to monitor performance. Inline statistical process control data is used to ensure that production tools are within performance expectations. Inline statistical process control database 24 also comprises a wafer particle database that stores a history of wafer particle data. When a wafer is processed by a tool, particles may accumulate on the wafer. A particle count indicating how many particles are produced in each processed wafer is collected periodically. The wafer particle data includes the periodic particle count values. In addition to the count, other properties may be collected and used without departing from the spirit and scope of the present disclosure.

Offline statistical process control database 26 comprises measurement data that is generated after control wafers are processed. Periodic maintenance database 28 comprises performance data of production tools after a periodic maintenance is performed on the tools.

In one illustrative embodiment, the selection of golden tools is made only for critical stages of production, because these critical stages are a priority for the manufacturing process. In this case, data from a critical stage configuration database 30 is also used as input data for the selection of golden tools. Critical stage configuration database 30 comprises configuration data, such as a thickness capability index (Cpk), which indicates whether a selected tool meets a certain thickness capability requirement. More details regarding the process of the selection of golden tools are discussed below with reference to FIG. 3.

Once a set of golden tools is selected by golden chamber selection system 20, real-time dispatching system 22 provides robust dispatching to assign critical or large die products to the selected golden tools. Real-time dispatching system 22 takes data from a computer integrated manufacturing (CIM) database 32, a work-in-progress (WIP) database 34, and a large die part configuration database 36 as input data and generates a fully automated operational environment 38 based on the input data.

Computer integrated manufacturing (CIM) database 32 integrates other manufacturing components, such as work-in-progress data, tool list data, and inhibition data, with real-time dispatching system 22. The integration may be accomplished by obtaining information of the manufacturing facility, such as recipes of production tools. In addition, CIM database 32 may include lot constraints and a tool status database indicating statuses of the tools.

Work-in-progress database 34 comprises manufacturing product lot information, for example, information concerning which lot of a product should arrive at a particular manufacturing stage. In addition, work-in-progress database 34 comprises dispatching instructions, such as information concerning how many lots a manufacturing stage shares. Large die part configuration database 36 comprises configuration data of large die products. However, other part configuration information may also be included in configuration database 36, for example, part configuration information of products that are critical to the customers.

With a fully automated operational environment 38, automatic dispatching, automatic transportation, automatic equipment operation may be performed. Automatic dispatching dispatches the selected golden tools for production. Automatic transportation arranges transportation of the large die products through an operational route of selected golden tools. Automatic equipment operation configures the selected golden tools for production of large die products 40.

In addition, with a fully automated operational environment 38, large-die products 40 are processed using the selected golden tools. For example, large die products 40 are processed first through equipment 42 in the OD etch process, followed by equipment 44 in the polysilicon etch process, and equipment 46 in the contact etch process. By processing large die products 40 with the selected golden tools, defect density (D0) may be reduced and better product yield (CP) may be achieved as a result.

Figure 3:
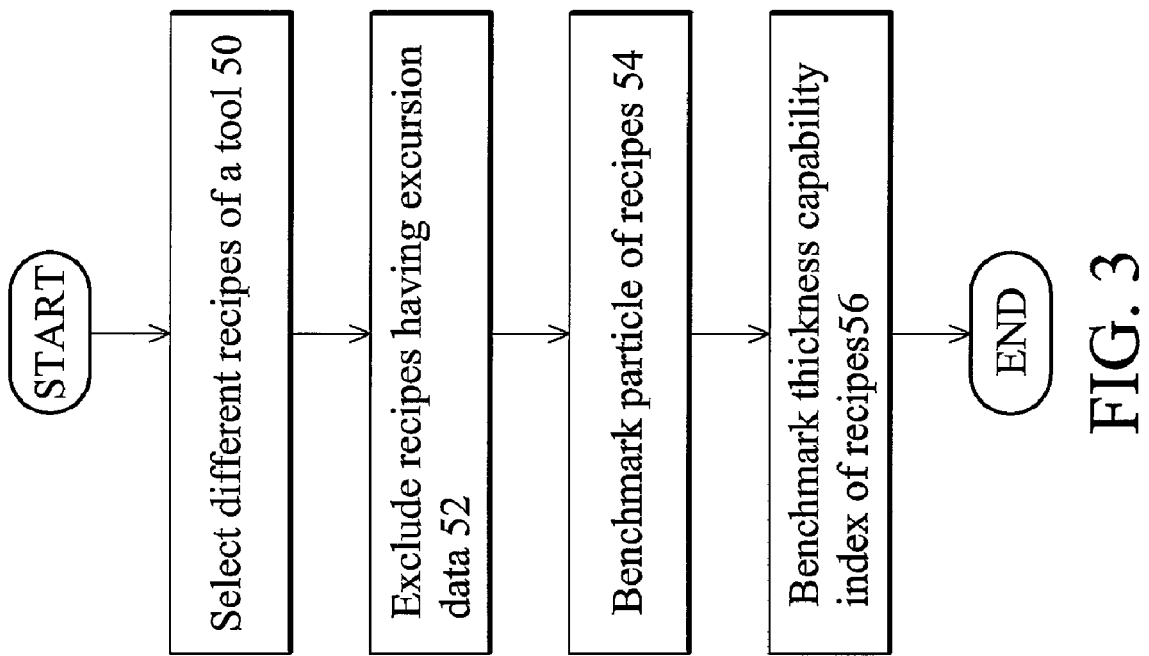
FIG. 3 is a process flowchart for an embodiment of a golden tool selection method performed by golden chamber selection system 20 in FIG. 2

FIG. 3 is a process flowchart of an embodiment of a golden tool selection method performed by golden chamber selection system 20 in FIG. 2. As shown in FIG. 3, the process of selecting golden tools begins at step 50, where different recipes of a tool are selected for a chamber. In step 52, recipes having excursion data are excluded. Excursion data is a data set that contains a large number of data points. In step 54, the particle of the recipes are benchmarked. The step of benchmarking particles includes calculating a particle count using a seven-day average of each recipe and determining if the particle count is below an acceptable threshold. In addition to a seven-day average of each recipe, other manual settings provided by the engineers may be used to calculate a particle count.

The process then proceeds to step 56 to benchmark the thickness capability index of the recipes. The thickness capability index indicates the capability of a recipe meeting a certain thickness specification. The larger the thickness capability index, the better performance a tool generates. The calculation of thickness capability index includes calculating a thickness of each recipe for seven days, for example. In addition to calculating a thickness of each recipe for seven days, other manual settings provided by the engineers may be used. After the thickness capability index is benchmarked, the process terminates. Based on the process as illustrated in FIG. 3, a ranking of tool performances in each step of wafer processing may be generated.

What follows is an exemplary selection of golden tools using the process in FIG. 3. In step 50, two different recipes are selected: PSG32_PA_C and PSG32_PT_C. Excursion of data is performed on the recipes to exclude recipes having a large number of data points. In this example, if PSG32_PA_C has greater than 30 data points, PSG32_PA_C is excluded in step 52. Similarly, if PSG32_PT_C has greater than 100 data points, PSG32_PT_C is excluded.

In step 54, benchmarking particle is performed. Benchmarking particle is performed by calculating a particle value using the seven day average of each recipe. In this example, the seven day average of recipe PSG32_PA_C and the seven-day average of recipe PSG32_PT_C are determined and a particle value is generated based on the sum of the seven day averages. If the particle value is greater than a threshold, in this example, 4.5, the recipe having a smaller particle value is chosen. If the particle value is below the threshold, the process continues to benchmark a thickness capability index of the recipes in step 56. During benchmarking of thickness capability index, the thickness capability index of each recipe for seven days is calculated. The recipe having a larger thickness capability index is chosen, because the larger thickness capability index, the better performance a tool with the given recipe generates. It is noted that the above calculations are examples shown for illustrative purpose. Other methods of calculation may be used in different manufacturing stages without departing from the spirit and scope of the present disclosure.

In summary, the aspects of the present disclosure provide a selection of golden tools for better defect density and product yield. A golden tool selection system and a real-time dispatching system are provided to integrate all components for robust golden tool selection and dispatching. In addition, the aspects of the present disclosure provide a fully automated operational environment that includes automatic dispatching, transportation, and equipment operation to support non-human operations.

Furthermore, the selection of the golden tools provide a ranking of performances of the tools and assigns a selected product, such as a large die product, to tools that provide the best performance. In this way, not only the yield of large die products may improve, but the yield of other critical products may also improve as a result of the reduced defect density. Consequently, customer service satisfaction may increase as critical products are manufactured more easily. In addition, the cost of production of these products may be lowered as more and more dies are produced with less number of wafers.

The present disclosure can take the form of an entirely hardware embodiment, an entirely software embodiment, or an embodiment containing both hardware and software elements. In an illustrative embodiment, the disclosure is implemented in software, which includes but is not limited to firmware, resident software, microcode, etc.

Furthermore, embodiments of the present disclosure may take the form of a computer program product accessible from a tangible computer-usable or computer-readable medium providing program code for use by or in connection with a computer or any instruction execution system. For the purposes of this description, a tangible computer-usable or computer readable medium can be any apparatus that can contain, store, communicate, propagate, or transport the program for use by or in connection with the instruction execution system, apparatus, or device.

The computer medium can be an electronic, magnetic, optical, electromagnetic, infrared, a semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disc (DVD).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method for improving a yield of a product, the method comprising:

selecting a set of golden tools from a set of manufacturing tools by using manufacturing data collected from a working piece processed using a plurality of recipes performed by each tool from the set of manufacturing tools to provide a ranking of tool performance for each tool in order to select the set of golden tools; and providing a fully automated operational environment to produce a product using the set of golden tools, wherein selecting the set of golden tools further comprises:
selecting the plurality of recipes for each of the set of manufacturing tools;
excluding a recipe having excursion data from the plurality of recipes to form a subset of recipes;
benchmarking particles of the subset of recipes; and
benchmarking thickness capability index of the subset of recipes, wherein the benchmarking thickness capability index of each recipe relates to the degree each recipe meets a specified thickness.

2. The method of claim 1, wherein excluding a recipe comprises:
examining a recipe in the plurality of recipes to determine if a number of data points of the recipe exceeds a threshold; and
excluding the recipe from the plurality of recipes if the number of data points of the recipe exceeds the threshold.

3. The method of claim 2, wherein benchmarking particle of the subset of recipes comprises:
calculating a value using a seven day average of each of the plurality of recipes;
determining if the value is below a threshold; and
selecting a recipe having a smaller value than other recipes in the plurality of recipes as a golden recipe in response to the value is not below the threshold.

4. The method of claim 2, wherein benchmarking thickness capability index of the subset of recipes comprises:
calculating a thickness capability index for seven days of each of the plurality of recipes; and
selecting a recipe having a larger thickness capability index than other recipes in the plurality of recipes as a golden recipe.

5. The method of claim 1, wherein the fully automated operational environment comprises automatic dispatching, automatic transportation, and automatic equipment operation.

6. The method of claim 5, wherein the automatic dispatching dispatches the set of golden tools for producing the product.

7. The method of claim 5, wherein the automatic transportation arranges transportation of the product through the set of golden tools.

8. The method of claim 1, wherein operations of the fully automated operational environment are machine operations.

9. The method of claim 1, wherein selecting a set of golden tools from a set of manufacturing tools based on performances of the set of manufacturing tools is performed by a golden chamber selection system.

10. The method of claim 9, wherein the golden chamber selection system takes inline statistical process control data, offline statistical process control data, and periodic maintenance data as input data.

11. The method of claim 10, wherein the inline statistical process control data comprises data that is collected during control wafer processing.

12. The method of claim 10, wherein the offline statistical process control data comprises measurement data that is generated after control wafers are processed.

13. The method of claim 10, wherein the periodic maintenance data comprises performance data of the set of manufacturing tools after a periodic maintenance is performed on the set of manufacturing tools.

14. The method of claim 1, wherein providing a fully automated operational environment to produce the product using the set of golden tools is performed by a real-time dispatching system.

15. The method of claim 14, wherein the real-time dispatching system takes common information model information, work-in-progress information, and product configuration information as input data.

16. The method of claim 15, wherein the common information model information comprises recipe information of the set of manufacturing tools.

17. The method of claim 15, wherein the work-in-progress information comprises dispatching instructions of the set of manufacturing tools.

18. An apparatus comprising a non-transitory, tangible computer readable storage medium storing a computer program, wherein the computer program has instructions that when executed, carry out:
collecting data from an actual performance of a set of manufacturing tools using a plurality of recipes on at least one working piece;
selecting a set of golden tools from the set of manufacturing tools by using the collected data to provide a ranking of tool performance for each tool in order to select the set of golden tools, wherein selecting the set of golden tools includes benchmarking thickness capability index of the plurality of recipes, the benchmarking thickness capability index of each recipe relating to the degree each recipe meets a specified thickness; and
providing a fully automated operational environment to produce a product using the set of golden tools.

19. The method of claim 18, wherein selecting the set of golden tools includes:
excluding a recipe having excursion data from the plurality of recipes to form a subset of recipes;
benchmarking particles of the subset of recipes; and
wherein benchmarking thickness capability index of the plurality of recipes includes benchmarking thickness capability of the subset of recipes.

20. A system for improving a yield of a product, the system comprising:
a selecting module operable to select a set of golden tools from a set of manufacturing tools by using manufacturing data collected from a working piece processed using a plurality of recipes performed by each tool from the set of manufacturing tools to provide a ranking of tool performance for each tool in order to select the set of golden tools, wherein the selecting module operable to select the set of golden tools from the set of manufacturing tools by using manufacturing data includes benchmarking thickness capability index of the plurality of recipes, the benchmarking thickness capability index of each recipe relating to the degree each recipe meets a specified thickness; and
a fully automated operational environment operable to produce a product using the set of golden tools.

* * * * *